UNITED STATES PATENT OFFICE.

GEORGE S. MILLER, OF CHICAGO, ILLINOIS, ASSIGNOR TO DENTAL CEMENT COMPANY, LTD., OF CHICAGO, ILLINOIS.

PROCESS FOR MAKING DENTAL CEMENTS.

1,172,723.     Specification of Letters Patent.     Patented Feb. 22, 1916.

No Drawing.     Application filed December 17, 1914. Serial No. 877,667.

*To all whom it may concern:*

Be it known that I, GEORGE S. MILLER, a citizen of the United States, residing in Chicago, county of Cook, and State of Illinois, have invented certain new and useful Improvements in Processes for Making Dental Cements, of which the following is a specification.

This invention relates to dental cements and the process for making the same, having for its object the production of such a cement possessing a vitreous structure which is adapted for filling and conforming to the cavities in teeth, thereby restoring the tooth to its natural appearance, due to the translucent characteristics of the cement. The present cement is also compounded so that it will be devoid of free alkalis that dissolve out of the cement when in the tooth cavity, attacking the nerve and the tooth and thereby discoloring the tooth and killing the nerve. This latter is also accomplished by the present cement in that it will not be affected by water or the fluids of the mouth.

In carrying out the process which results in the cement with the characteristics above referred to, a selected beryl stone is powdered and constitutes a base upon which the cement is founded. The powdered beryl is then thoroughly washed, after which boracic acid powder (or borax) is added to the washed base or beryl. The boracic acid or the borax acts as a flux during the process of manufacturing the cement, and aids in setting when the cement is used in practice, by acting on the phosphoric acid which is compounded with the cement by the dentist.

The mass, comprising beryl and boracic acid is then mixed with powdered sodium-aluminum fluorid (cryolite), which acts as a very powerful flux when the mass is fused, and further aids in providing the aluminum necessary to the strength and durability of the cement. Pyro-phosphoric acid is then added to the mass of beryl, boracic acid and cryolite, until such mass is thoroughly saturated with said acid. This pyro-phosphoric acid not only aids in combining with the other elements of the cement in producing a more durable and translucent cement, but also acts as a regulator for the mass, dependent upon the amount of phosphoric acid, for owing to the fact that it is in liquid form, the consistency of the same can be easily regulated by varying the amount of acid added. It will thus be noted that a portion of the pyro-phosphoric acid is compounded in the powder when it is made and another portion of the said acid is additionally added by the dentist at the time he is about to employ the composition as a cement. The advantage of this is that the dentist is able to regulate the rapidity of the setting of the cement by varying the quantity of acid last added. If it is found by tests that the beryl and the compound which has been described up to this point as comprising beryl, boracic acid, cryolite, and pyro-phosphoric acid, does not contain enough aluminum at this point, aluminum oxid is added in the necessary quantities to increase the percentage of aluminum in the composition. The entire mass or powder is then mixed with sufficient water for it to pack in a crucible, and after being placed in said crucible it is transferred to a kiln under a heat of from 1900° F. to 2000° F., until the mass is melted, which requires from six to seven hours, as the case may be. After the mass is thoroughly melted, it is then removed from the crucible, and, when cooled, is broken and ground into a powder.

It is apparent that the cement which results from the foregoing process comprises a base of powdered beryl, boracic acid or borax, preferably boracic acid, sodium aluminum fluorid (cryolite) and pyro-phosphoric acid, and if necessary aluminium oxid, all being melted together and compounded in the necessary percentages to produce a cement which will, when in use, set as required by the consumer.

I claim as my invention:

1. A process for forming dental cement which consists in adding boracic acid powder to powdered beryl, then adding powdered sodium-aluminum fluorid, then saturating the mixed powdered mass with pyro-phosphoric acid, then adding a desired quantity of water, placing the semi-liquid mass in a receptacle and exposing to heat for a sufficient time to produce a thorough melting, then removing and cooling the melted combined mass, reducing the same to a powdered form, and finally adding an additional quantity of pyro-phosphoric acid to the powdered mixture at the time it is to be used as a cement.

2. A process for forming dental cement which consists in adding boracic acid powder to powdered and washed beryl, then adding powdered sodium-aluminum fluorid, then saturating the mixed powdered mass with pyro-phosphoric acid, then adding a desired quantity of water, placing the semi-liquid mass in a receptacle and exposing to heat for a sufficient time to produce a thorough melting, then removing and cooling the melted combined mass, reducing the same to a powdered form, and finally mixing said powder with an additional and desired quantity of pyro-phosphoric acid at the time the cement is ready to be used.

In testimony whereof I have hereunto affixed my name in the presence of two witnesses.

GEORGE S. MILLER.

Witnesses:
 MAY D. FLYNN,
 ROBT. KLOTZ.